(12) United States Patent
Carter et al.

(10) Patent No.: US 10,654,522 B2
(45) Date of Patent: May 19, 2020

(54) SYSTEM FOR ACTIVELY MONITORING THE STEERING ANGLE OF A VEHICLE USING A KINGPIN SENSOR

(71) Applicant: UATC, LLC, San Francisco, CA (US)

(72) Inventors: Mike Carter, La Jolla, CA (US); Aaron Sellars, Mountain View, CA (US)

(73) Assignee: UATC, LLC, San Francisco, CA (US)

( * ) Notice: Subject to any disclaimer, the term of this patent is extended or adjusted under 35 U.S.C. 154(b) by 260 days.

(21) Appl. No.: 15/786,778

(22) Filed: Oct. 18, 2017

(65) Prior Publication Data

US 2019/0071124 A1 Mar. 7, 2019

Related U.S. Application Data

(60) Provisional application No. 62/555,356, filed on Sep. 7, 2017.

(51) Int. Cl.
*B62D 15/02* (2006.01)
*B62D 7/18* (2006.01)
*G05D 1/00* (2006.01)

(52) U.S. Cl.
CPC ............ *B62D 15/023* (2013.01); *B62D 7/18* (2013.01); *G05D 1/0088* (2013.01); *G05D 2201/0213* (2013.01)

(58) Field of Classification Search
CPC ...... B62D 15/023; B62D 7/18; G05D 1/0088; G05D 2201/0213
See application file for complete search history.

(56) References Cited

U.S. PATENT DOCUMENTS

| 6,502,839 B1 * | 1/2003 | Chino | B62D 15/023 280/93.512 |
|---|---|---|---|
| 2018/0057051 A1 * | 3/2018 | Passero | B62D 15/023 |

* cited by examiner

*Primary Examiner* — Nga X Nguyen
(74) *Attorney, Agent, or Firm* — Dority & Manning, P.A.

(57) ABSTRACT

A system for monitoring a steering angle of a wheel of a steering assembly of a vehicle may include a sensor cap configured to be coupled to a steering knuckle of the steering assembly at an open end of a bore defined by the steering knuckle such that the sensor cap is mounted for rotation with the steering knuckle about a kingpin. In addition, the system may include a kingpin sensor configured to be coupled between the sensor cap and the kingpin. The kingpin sensor may be configured to detect relative rotation between the steering knuckle and the kingpin.

18 Claims, 7 Drawing Sheets

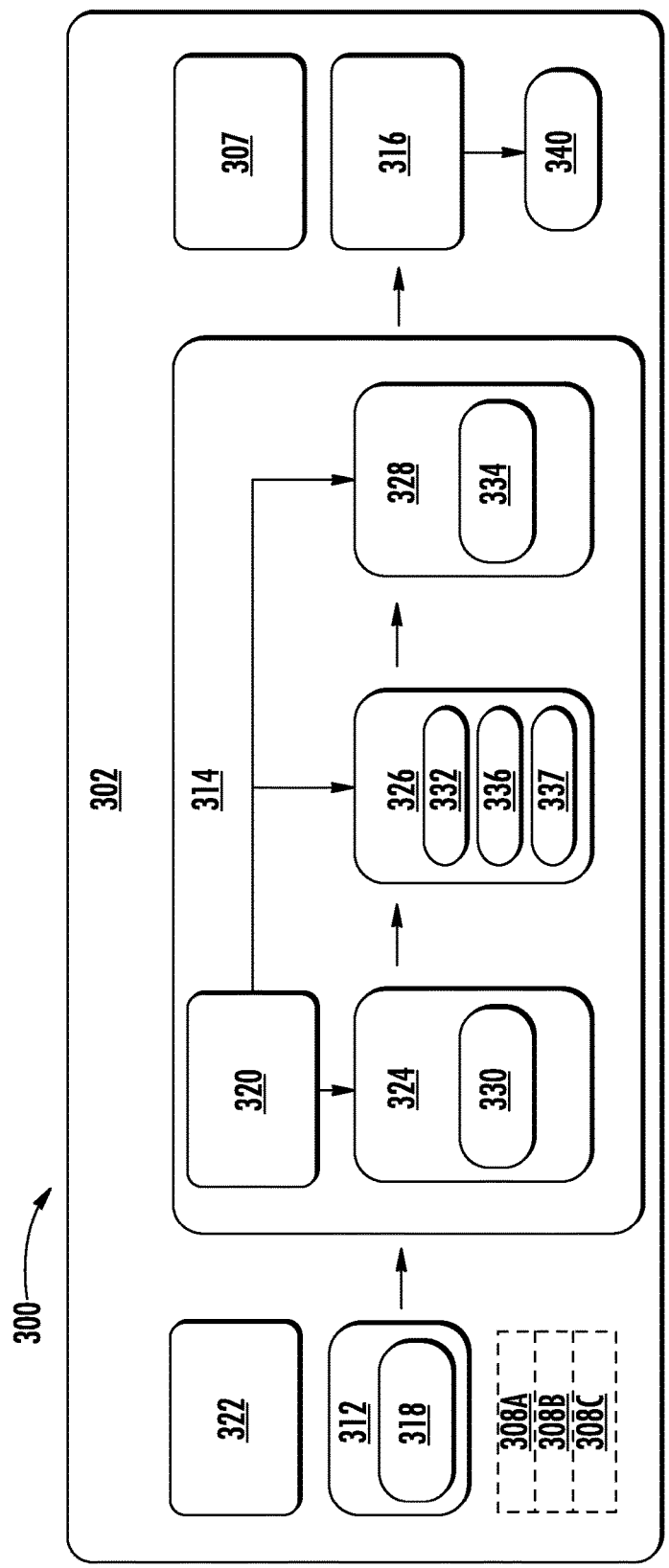
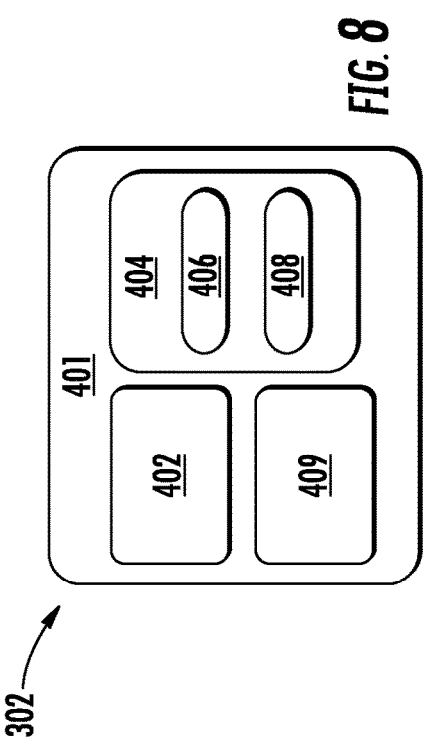

SYSTEM FOR ACTIVELY MONITORING THE STEERING ANGLE OF A VEHICLE USING A KINGPIN SENSOR

FIELD

The present disclosure relates generally to steering assemblies for vehicles and, more particularly, to a system for use with a vehicle, such as an autonomous vehicle, that includes a kingpin sensor for monitoring the steering angle of one or more of the vehicle's wheels. The present disclosure also relates to a vehicle, such as an autonomous vehicle, incorporating one or more of the aspects of the disclosed system.

BACKGROUND

A vehicle, such as a car, truck, semi-trailer truck, bus, and/or the like, typically includes a steering assembly for steering the vehicle as it is being operated. A conventional steering assembly includes a steering axle extending between opposed wheels of the vehicle. Each wheel is pivotally coupled to the steering axle via a steering knuckle configured to rotate relative to the axle via a kingpin. As the steering knuckle rotates about the kingpin, the steering angle of the associated wheel is changed, thereby allowing the vehicle to be steered as desired.

SUMMARY

Aspects and advantages of embodiments of the present disclosure will be set forth in part in the following description, or may be learned from the description, or may be learned through practice of the embodiments.

In one aspect, the present subject matter is directed to an apparatus including a sensor cap configured to be provided in operative association with a steering assembly associated with a wheel of a vehicle. The steering assembly may include a steering knuckle rotatable about a kingpin extending through a bore defined by at least a portion of the steering knuckle. The sensor cap may be configured to be coupled to the steering knuckle at an open end of the bore such that the sensor cap is configured to rotate with the steering knuckle about the kingpin. The apparatus may also include a kingpin sensor configured to be coupled between the sensor cap and the kingpin. The kingpin sensor may be configured to generate a signal indicative of a steering angle of the wheel by detecting relative rotation between the steering knuckle and the kingpin In another aspect, the present subject matter is directed to a system for monitoring a steering angle of a wheel of a steering assembly of a vehicle, with the steering assembly including a steering knuckle rotatable about a kingpin extending through a bore defined by at least a portion of the steering knuckle. The system may include a sensor cap configured to be coupled to the steering knuckle at an open end of the bore such that the sensor cap is configured to rotate with the steering knuckle about the kingpin. In addition, the system may include a kingpin sensor configured to be coupled between the sensor cap and the kingpin. The kingpin sensor may be configured to generate a signal indicative of a steering angle of the wheel by detecting relative rotation between the steering knuckle and the kingpin.

In a further aspect, the present subject matter is directed to a steering assembly for a vehicle. The steering assembly may include an axle beam, a steering knuckle rotatable relative to the axle beam about a kingpin extending through a bore defined by at least a portion of the steering knuckle, and a wheel coupled to the steering knuckle such that a steering angle of the wheel varies as the steering knuckle rotates about the kingpin. The steering assembly may also include a sensor cap coupled to the steering knuckle at an open end of the bore such that the sensor cap is configured to rotate with the steering knuckle about the kingpin. In addition, the steering assembly may include a kingpin sensor coupled between the sensor cap and the kingpin. The kingpin sensor may be configured to generate a signal indicative of the steering angle of the wheel by detecting relative rotation between the steering knuckle and the kingpin In yet another aspect, the present subject matter is directed to vehicle including an axle beam, a steering knuckle rotatable relative to the axle beam about a kingpin extending through a bore defined by at least a portion of the steering knuckle, and a wheel coupled to the steering knuckle such that a steering angle of the wheel varies as the steering knuckle rotates about the kingpin. The vehicle may also include a sensor cap coupled to the steering knuckle at an open end of the bore such that the sensor cap is configured to rotate with the steering knuckle about the kingpin and a kingpin sensor coupled between the sensor cap and the kingpin. The kingpin sensor may be configured generate signals indicative of the steering angle of the wheel by detecting relative rotation between the steering knuckle and the kingpin. In addition, the vehicle may include a vehicle computing system communicatively coupled to the kingpin sensor. The vehicle computing system may include one or more processors and one or more tangible, non-transitory, computer readable media that collectively store instructions that when executed by the one or more processors cause vehicle computing system to actively monitor the steering angle of the wheel based on the signals received from the kingpin sensor.

Other example aspects of the present disclosure are directed to systems, methods, vehicles, apparatuses, tangible, non-transitory computer-readable media, and memory devices for monitoring the steering angle of a vehicle and/or controlling a vehicle based, at least in part, on the same.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 7 illustrates a schematic view of one embodiment of an example system in accordance with aspects of the present subject matter, particularly illustrating a vehicle computing system for controlling an autonomous vehicle; and FIG. 8 illustrates a schematic view of one embodiment of components of a computing device(s) of the vehicle computing system shown in FIG. 7 in accordance with aspects of the present subject matter.

DETAILED DESCRIPTION

Figure 1:
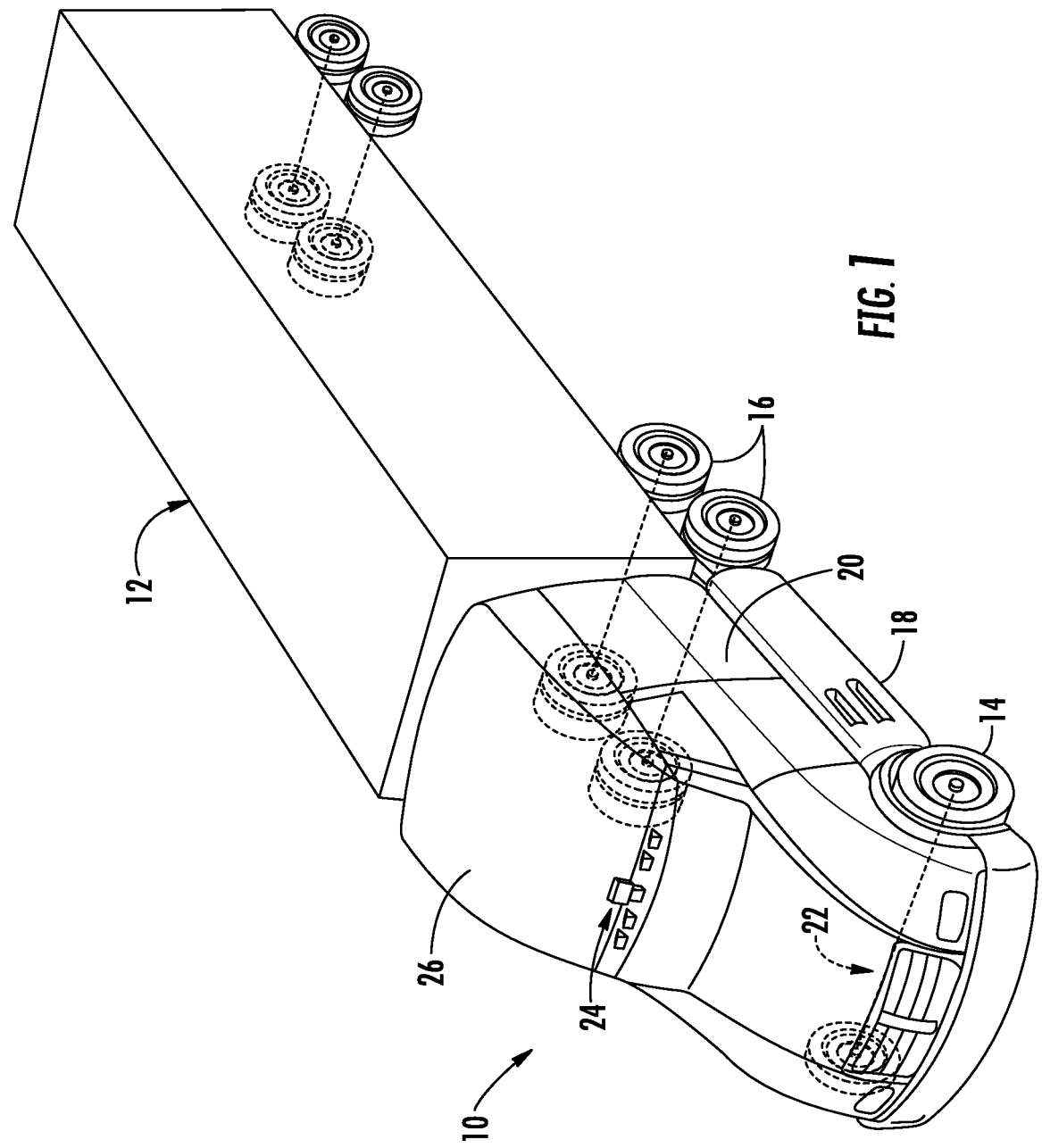
FIG. 1 illustrates a perspective view of one embodiment of a vehicle configuration for a vehicle, such as an autonomous vehicle, in accordance with aspects of the present subject matter.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

In general, the present subject matter is directed to a system for monitoring a steering angle of a vehicle. Specifically, in several embodiments, the system may include a steering assembly having a kingpin sensor for monitoring the steering angle of an associated wheel of the vehicle. As will be described below, the steering assembly may, in certain embodiments, be adapted for use within an autonomous vehicle to allow the steering angle of one or more of the vehicle's wheels to be actively monitored. For example, the kingpin sensor may be configured to monitor the relative rotational position between a kingpin and an associated steering knuckle of the steering assembly, which is directly related to the steering angle of the wheel coupled to the steering knuckle. The detected steering angle may then be transmitted to the vehicle's computing system and utilized as an input for automatically controlling the vehicle's operation. In particular, by directly monitoring the steering angle of one or more of the vehicle's wheels, the vehicle computing system may be capable of controlling the motion of the vehicle with improved accuracy, particularly when turning the vehicle or performing other steering-related actions. Thus, it should be appreciated that the disclosed kingpin sensor and/or related steering assembly can be incorporated into or otherwise form part of any suitable system and/or related method for improving the accuracy and/or effectiveness of controlling the operation of an autonomous vehicle.

By positioning the disclosed sensor at the kingpin, the disclosed system is more responsive to changes in steering angle than other systems that may be configured to detect a vehicle's steering angle based on monitoring the change in position of upstream components, such as upstream steering linkages. In particular, given the lag between changes in position of such upstream components and actual changes in the steering angle, latency errors exist in the sensor measurements provided with upstream detection systems. In contrast, the disclosed kingpin sensor allows for detection of the relative rotation between the kingpin and the steering knuckle coupled directly to the wheel being monitored, thereby providing for more accurate, real-time sensing of steering angle changes.

In one embodiment, the steering assembly includes a sensor cap configured to be coupled to the steering knuckle to accommodate the kingpin sensor at a location adjacent to the associated kingpin. Specifically, the sensor cap may be coupled to the steering knuckle at an open end of the bore defined through the knuckle for receiving the kingpin. As a result, in addition to providing structure for coupling the sensor between the steering knuckle and the kingpin, the sensor cap may also function as a grease cap for sealing the bore and preventing lubricant leakage.

Additionally, in one embodiment, the kingpin sensor may correspond to an optical encoder coupled to the sensor cap such that a shaft of the encoder extends through an opening defined in the sensor cap. In such an embodiment, the encoder shaft may be coupled to an adjacent end of the kingpin. As a result, as the steering knuckle rotates relative to the kingpin, the encoder may detect such relative rotation as the portion of the encoder fixed to the sensor cap rotates relative to the shaft.

In another embodiment, the kingpin sensor may include a rotor rotatable relative to a stator. In such an embodiment, the rotor may be coupled to one of the kingpin or the sensor cap while the stator may be coupled to the other of the kingpin or the sensor cap. In such an embodiment, relative rotation between the stator and the rotor may be detected using one or more sensing techniques depending on the configuration of the sensor. For instance, in one embodiment, the stator and rotor may form part of an inductive encoder. Alternatively, the sensor may be configured as a resolver to allow for the relative rotation between the stator and the rotor to be detected.

Additionally, in one aspect, the present subject matter is also directed to a vehicle incorporating the disclosed kingpin sensor and related steering assembly components. In several embodiments, the vehicle may correspond to an autonomous vehicle. As described herein, an autonomous vehicle may be any suitable vehicle (e.g., car, truck, bus, etc.) that can operate with reduced, minimal, and/or no interaction from a human operator. Thus, in several embodiments, an autonomous vehicle can include a vehicle computing system located onboard the vehicle to help control the vehicle's operation. In this regard, the vehicle computing system can include one or more sensors (e.g., cameras, Light Detection and Ranging (LIDAR), Radio Detection and Ranging (RADAR), etc.), an autonomy computing system (e.g., for determining autonomous navigation), one or more vehicle control systems (e.g., for controlling braking, steering, powertrain), etc. In one embodiment, the sensor(s) can gather sensor data (e.g., image data, RADAR data, LIDAR data, etc.) associated with the surrounding environment of the vehicle. For example, the sensor data can include LIDAR point cloud(s) and/or other data associated with one or more object(s) that are proximate to the autonomous vehicle (e.g., within a field of view of the sensor(s)) and/or one or more geographic characteristics of the geographic area (e.g., curbs, lane markings, sidewalks, etc.). Such sensor data may then be provided to the vehicle's autonomy computing system for controlling the operation of the vehicle.

Additionally, in several embodiments, the disclosed kingpin sensor may form part of or may otherwise be communicatively coupled to the vehicle computing system, thereby allowing the steering angle measurements to be transmitted to vehicle's autonomy computing system. In such an embodiment, the autonomy computing system may process the sensor data provided by the kingpin sensor to allow the vehicle's operation to be actively controlled based, at least in part, on the steering angle measurements. For example, the steering angle measurements may be used to actively adjust the steering angle of one or more of the vehicle's wheels as the autonomous vehicle is being operated.

It should be appreciated that, although the present subject matter will generally be described herein with reference to applications within autonomous vehicles, the disclosed kingpin sensor and related steering assembly may be incorporated into or otherwise used within any suitable vehicle to allow for accurate and reliable monitoring of the steering angle of one or more of the vehicle's wheels, such as a human driven car with little or no autonomous features or a vehicle having semi-autonomous capabilities.

Referring now to the drawings, FIG. 1 illustrates a perspective view of one embodiment of a suitable vehicle configuration for an autonomous vehicle 10 in accordance with aspects of the present subject matter. As shown, the vehicle 10 corresponds to a semi-trailer truck (also referred to as a semi truck or simply a semi) forming part of a tractor unit or assembly for hauling freight or cargo contained within a semi-trailer 12. However, in other embodiments, the autonomous vehicle 10 may have any other suitable vehicle configuration, such as by being configured as a car, conventional passenger truck, van, bus, and/or the like.

The vehicle 10 may generally include a pair of front wheel assemblies 14, one or more pairs of rear wheel assemblies 16, and a main frame or chassis 18 coupled to and supported by the wheel assemblies 14, 16. A cab 20 may be supported by a portion of the chassis 18 and may house various components for controlling the operation of the vehicle 10. Additionally, as is generally understood, the vehicle 10 may include an engine (not shown) and a transmission (not shown) mounted on the chassis 18. The transmission may be operably coupled to the engine and may provide variably adjusted gear ratios for transferring engine power to one or more pairs of the wheel assemblies 14, 16.

Moreover, the vehicle 10 may also include one or more steering assemblies for steering one or more of the wheel assemblies 14, 16. For example, as shown in the illustrated embodiment, the vehicle 10 includes a front steering assembly 22 provided in operative association with the front wheel assemblies 14, thereby allowing the steering angle of each front wheel assembly 14 to be adjusted for turning or otherwise steering the vehicle 10. As will be described below, the steering assembly 22 may, in several embodiments, incorporate one or more sensors that allow the steering angle of one or both of the associated wheel assemblies 14 to be actively monitored during operation of the vehicle 10.

Additionally, the vehicle 10 may also include one or more sensors and/or sensor systems configured to acquire sensor data associated with the vehicle's surrounding environment, such as one or more Light Detection and Ranging (LIDAR) systems, one or more Radio Detection and Ranging (RA-DAR) systems, one or more cameras (e.g., visible spectrum cameras, infrared cameras, etc.), and/or any other suitable sensor and/or sensor system for acquiring data associated with the vehicle's environment. Such sensor data may then be used as an input for controlling the operation of the vehicle 10. For instance, as shown in the embodiment of FIG. 1, the vehicle 10 includes a LIDAR system 24 mounted at the top of the cab 20, such as directly in front of an air dam 26 extending along the top side of the cab 20. However, in other embodiments, the LIDAR system 24 may be installed at any other suitable location on the vehicle 10 that allows it to capture suitable data that can be used for autonomously controlling the operation of the vehicle 10.

It should be appreciated that the LIDAR system 24 may generally include various types of emitters and/or detectors, such as various types of lasers and photometric detectors. In one embodiment, the LIDAR system 24 can emit (e.g., over 360 degrees) one or more ranging lasers. For example, the ranging lasers can be focused, low-power beams of light of a specified wavelength, and may detect and record the reflection of such wavelengths of light from various objects. The resulting sensor data may include information that describes at least a portion of the surrounding environment of the vehicle 10. For instance, the sensor data may be indicative of the location of static and/or non-static objects (e.g., lane markings, pedestrians, vehicles) within the surrounding environment of the vehicle 10. In a particular embodiment, the sensor data derived from the LIDAR system 24 may include a plurality of points that correspond to a portion of the surrounding environment that have reflected a ranging laser within a three-dimensional space relative to the LIDAR system 24 (e.g., as the vehicle 10 is in motion, or while the vehicle 10 is stopped). In such an embodiment, the LIDAR system 24 may measure distances by measuring the Time of Flight (TOF) that it takes a laser pulse to travel from the emitter to an object and back to a detector, calculating the distance from the known speed of light. Such detected data can be used to generate a LIDAR point cloud representing the points of light reflected from the object and returned to the detector, thus indicating specific points of the object present in the environment. The LIDAR system 24 can acquire the sensor data in real-time or near real-time (e.g., as the vehicle 10 is in motion) and can provide such data for subsequent processing by the vehicle's computing system (e.g., computing system 302 shown in FIG. 7).

It should be appreciated that the configuration of the vehicle 10 described above and shown in FIG. 1 is provided only to place the present subject matter in an exemplary field of use. Thus, it should be appreciated that the present subject matter may be readily adaptable to any manner of vehicle configuration. In addition, although the vehicle 10 is generally described herein as an autonomous vehicle, the vehicle 10 may, instead, correspond to a conventional, operator-driven vehicle.

Figure 2:
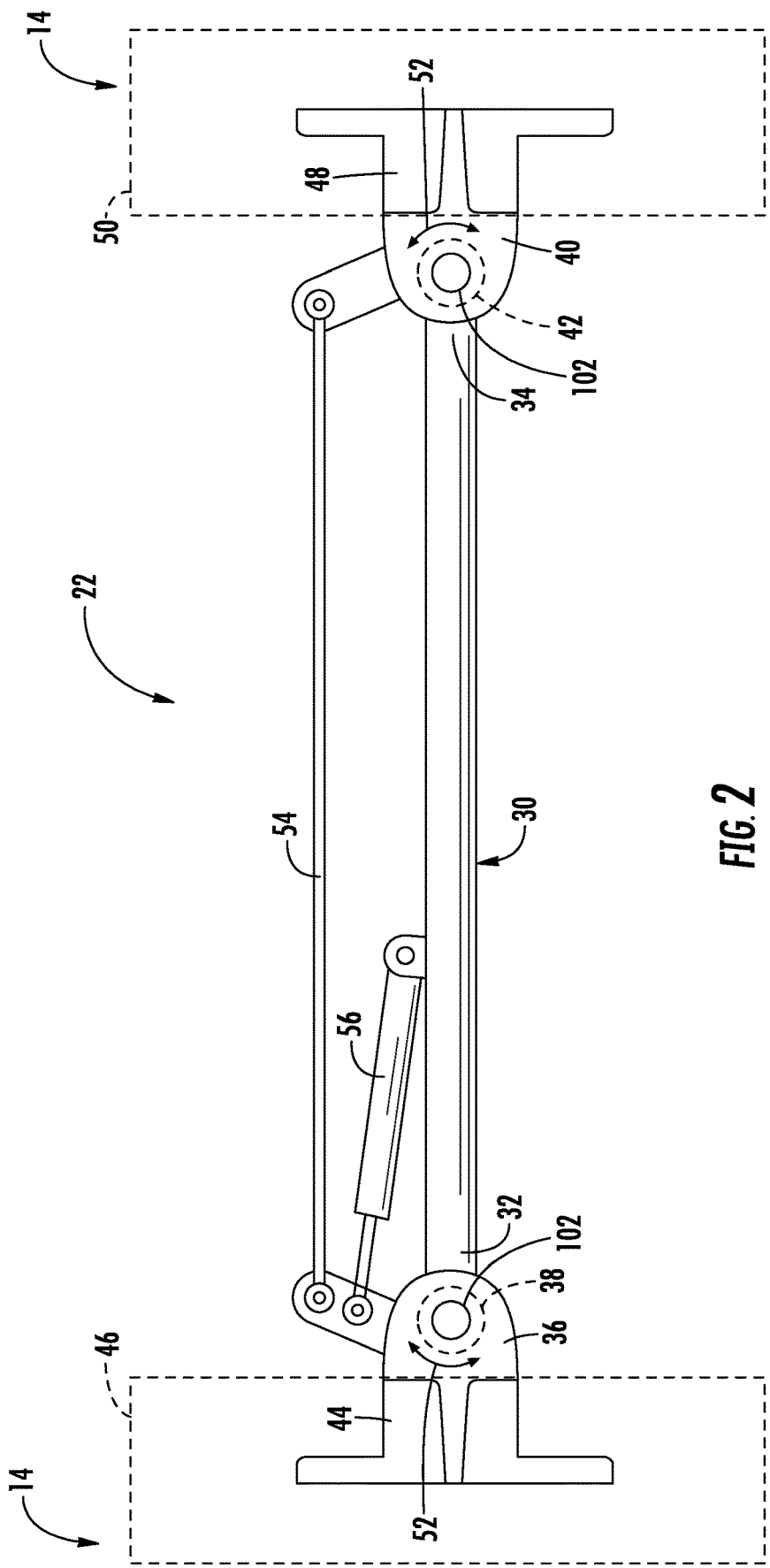
FIG. 2 illustrates a schematic, top-down view of one embodiment of components of a steering assembly suitable for use within a vehicle, such as the autonomous vehicle shown in FIG. 1, in accordance with aspects of the present subject matter.

Referring now to FIG. 2, a schematic view of one embodiment of a steering assembly suitable for use with a vehicle is illustrated in accordance with aspects of the present subject matter. For exemplary purposes, the steering assembly will be described herein as corresponding to the steering assembly 22 of the vehicle 10 shown in FIG. 1. However, it should be appreciated that, in general, the steering assembly shown in FIG. 2 may be configured for use within any suitable vehicle having any suitable vehicle configuration.

As shown, the steering assembly 22 may generally include a steering axle 30 extending longitudinally between a first end 32 and a second end 34. In addition, the steering assembly 22 may include a first steering knuckle 36 pivotally coupled to the first end 32 of the steering axle 30 via a first kingpin 38 and a second steering knuckle 40 pivotally coupled to the second end 34 of the steering axle 30 via a second kingpin 42. Each steering knuckle 36, 40 may, in turn, be coupled to an adjacent wheel assembly 14 of the associated vehicle 19. For example, in the illustrated embodiment, the first steering knuckle 36 is coupled to a first wheel 44 of one of the front wheel assemblies 14 shown in FIG. 1, with the first wheel 44 being rotationally fixed to a corresponding tire 46 of such front wheel assembly 14. Similarly, the second steering knuckle 40 is coupled to a second wheel 48 of the opposed front wheel assembly 14, with the second wheel 48 being rotationally fixed to a corresponding tire 50 of such front wheel assembly 14.

As is generally understood, each steering knuckle 36, 40 may be configured to pivot relative to the steering axle 30 about its associated kingpin 38, 42 (e.g., in the direction of arrows 52 in FIG. 2) to allow the steering angle of the adjacent wheel 44, 48 (and associated tire 46, 50) to be adjusted. Specifically, as each steering knuckle 36, 40 pivots relative to the steering axle 30, the adjacent wheel assembly 14 may generally pivot about an axis extending perpendicular to the vehicle's driving surface, thereby adjusting the steering angle of the wheel assembly 14 and allowing the vehicle 10 to be turned or steered. Additionally, as shown in FIG. 2, in one embodiment, the steering assembly 22 may also include a tie rod 54 coupled between the first and second steering knuckles 36, 40 to ensure that the opposed wheel assemblies 14 pivot in unison relative to the steering axle 30. Moreover, as shown in FIG. 2, a steering cylinder 56 may also be coupled between the steering axle 30 and one of the steering knuckles (e.g., the second steering knuckle 40) to pivotally actuate such knuckle 40 relative to its associated kingpin 42 with extension/retraction of the cylinder 56. In such an embodiment, given the rigid connection between the steering knuckles 36, 40 provided via the tie rod 54, extension/retraction of the steering cylinder 56 may, in turn, allow for the steering angle of each wheel assembly 14 to be adjusted simultaneously.

Additionally, in accordance with aspects of the present subject matter, the steering assembly 22 may include one or more kingpin sensors 102 configured to monitor the steering angle of one or both of the wheel assemblies 14. For example, as will be described in greater detail below, the kingpin sensor(s) 102 may be configured to detect relative rotation between one of the steering knuckles 36, 40 and its associated kingpin 38, 42, which is directly related to the steering angle of the wheel assembly 14 coupled thereto. As shown in the illustrated embodiment, a kingpin sensor 102 may, for example, be provided in operative association between each kingpin 38, 42 and its associated steering knuckle 36, 40 to allow the steering angle of each wheel assembly 14 to be independently monitored. However, in other embodiments, given the tie rod 54 connection between the steering knuckles 36, 40, a single kingpin sensor 102 may be used to monitor the steering angle of both wheel assemblies 14.

Figure 3:
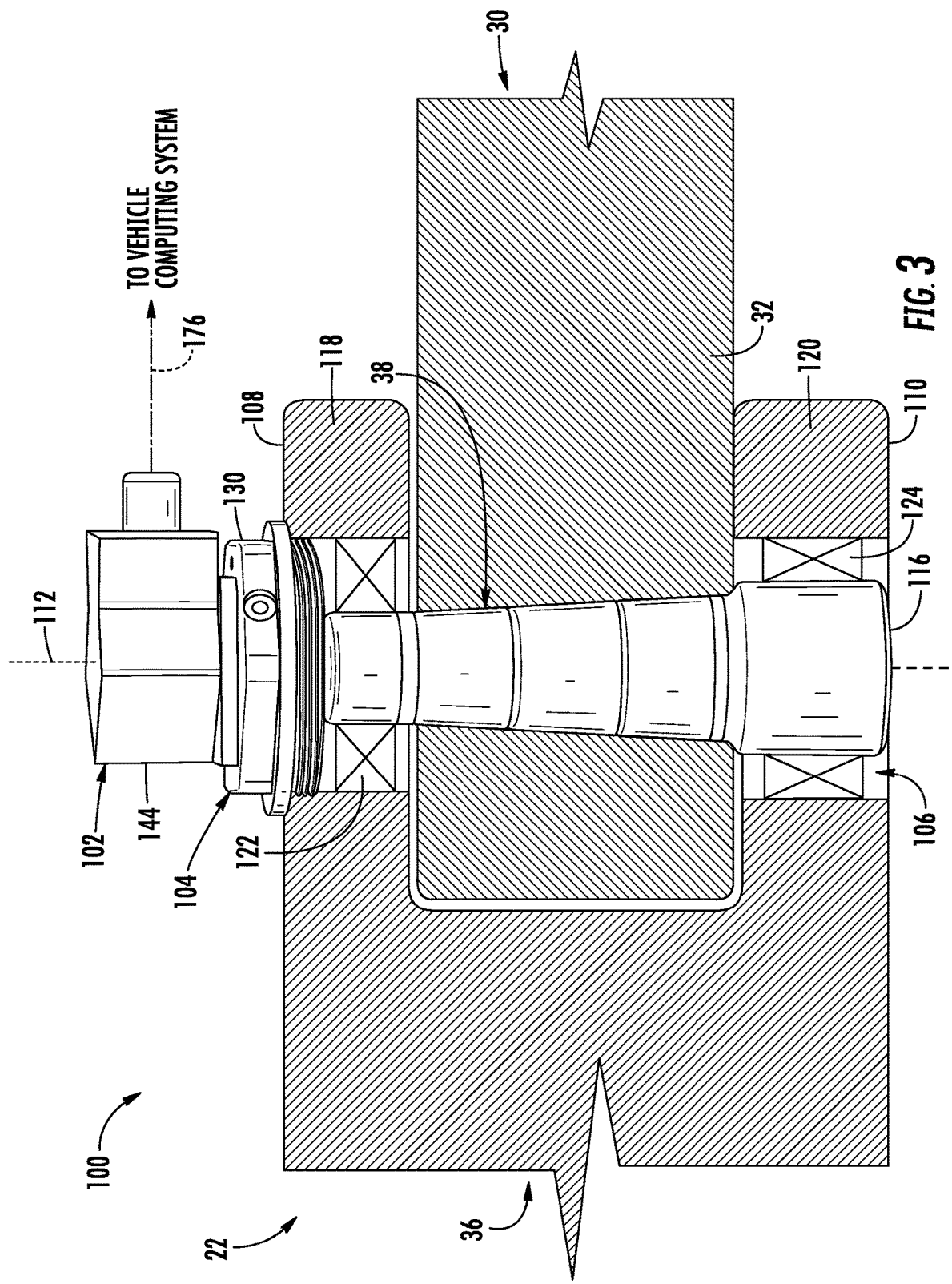
FIG. 3 illustrates a side view of one embodiment of a system including a kingpin sensor and associated sensor cap installed relative to a steering knuckle and adjacent kingpin of a steering assembly to allow the steering angle of an associated wheel to be monitored in accordance with aspects of the present subject matter.
Figure 4:
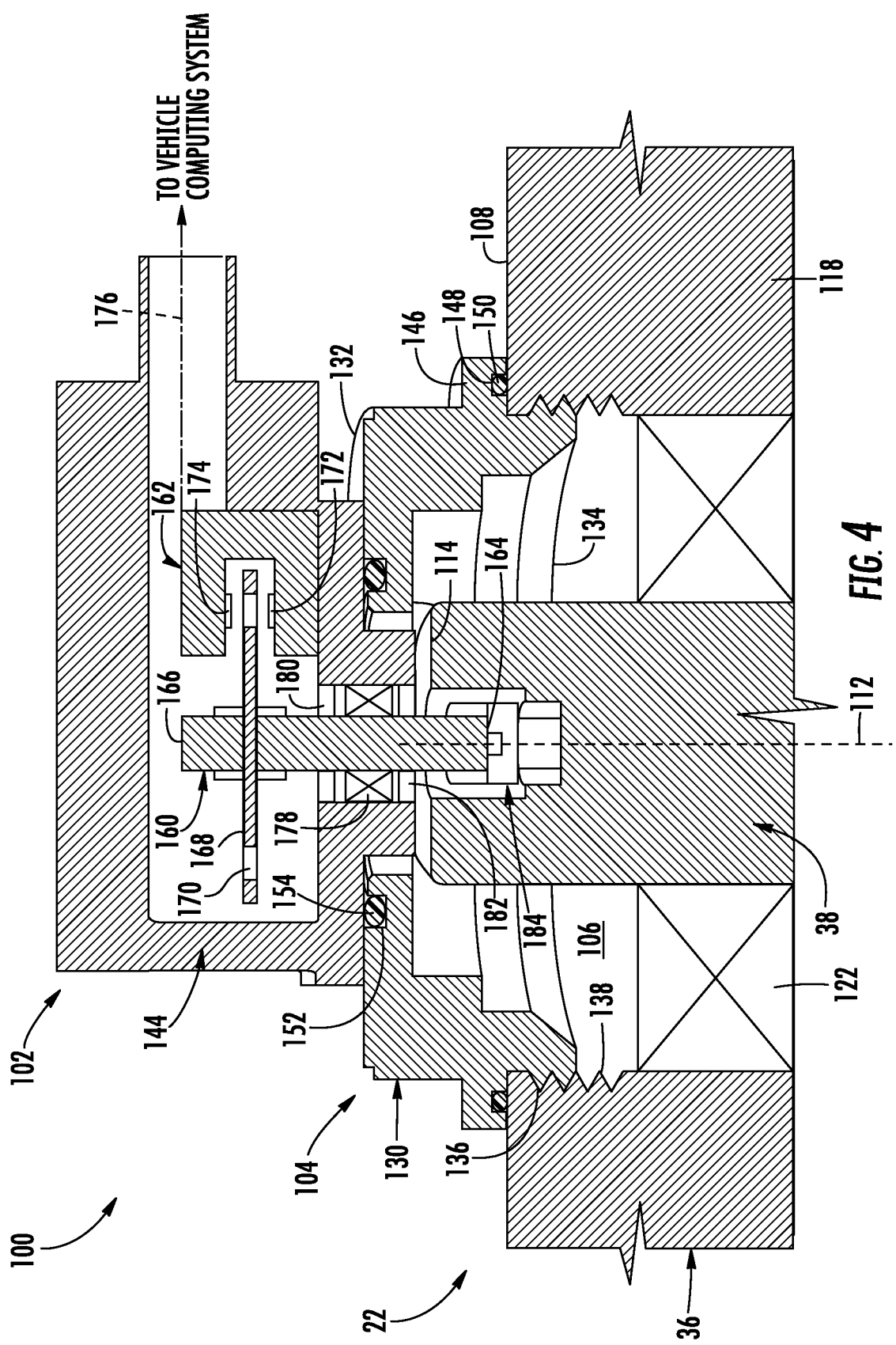
FIG. 4 illustrates a cross-sectional view of the kingpin sensor and the sensor cap shown in FIG. 3 installed relative to a portion of the steering knuckle and adjacent kingpin.
Figure 5:
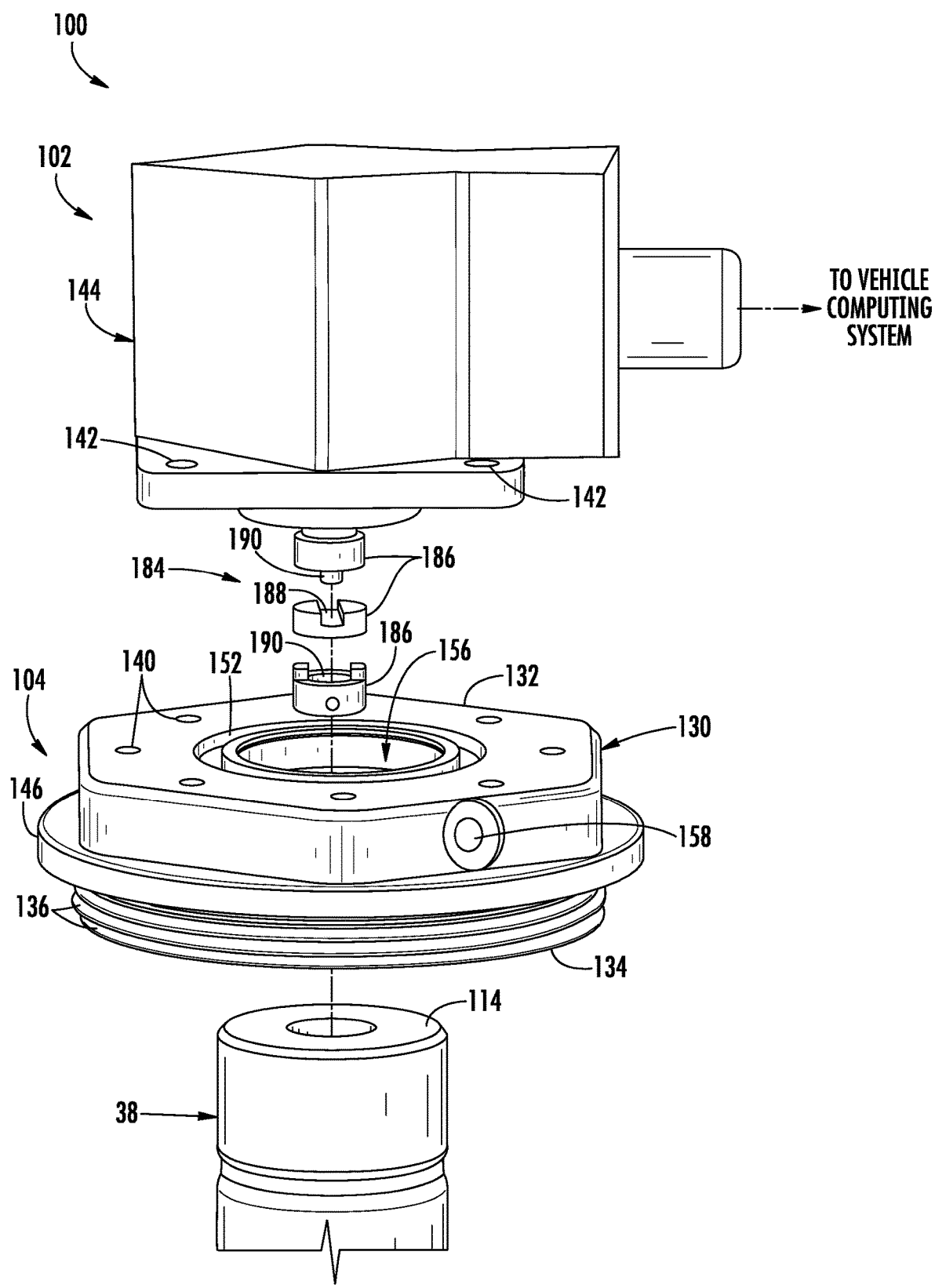
FIG. 5 illustrates an exploded, perspective view of the kingpin sensor and the sensor cap shown in FIG. 3, particularly illustrating the sensor and sensor cap exploded away from an adjacent end of the kingpin.

Referring now to FIGS. 3-5, several views of one embodiment of a kingpin sensor 102 and associated sensor cap 104 suitable for use within a system 100 for monitoring the steering angle of one or more vehicle wheels are illustrated in accordance with aspects of the present subject matter. Specifically, FIG. 3 illustrates a side view of the kingpin sensor 102 and the sensor cap 104 installed relative to the first kingpin 38 and associated steering knuckle 36 of the steering assembly 22 shown in FIG. 2, particularly illustrating the steering knuckle 36 and the adjacent end 32 of the steering axle 30 in cross-section. FIG. 4 illustrates a cross-sectional view of the kingpin sensor 102 and the sensor cap 104 shown in FIG. 3, particularly illustrating the kingpin sensor 102 and the sensor cap 104 installed relative to an adjacent portion of the steering knuckle 36. Additionally, FIG. 5 illustrates an exploded view of the kingpin sensor 102 and the sensor cap 104 shown in FIG. 3, with the sensor 102 and sensor cap 104 exploded away from an adjacent end of the associated kingpin 38.

As indicated above, the steering knuckle 36 may be rotatable or pivotable relative to the steering axle 30 about its associated kingpin 38. Thus, in several embodiments, the steering knuckle 36 may define a through-hole or bore 106 between its top and bottom ends 108, 110 for receiving the kingpin 38 such that the kingpin 38 extends within the bore 106 along a pivot axis 112 (FIGS. 3 and 4) of the steering knuckle 36. For example, as shown in FIG. 3, the kingpin 38 may extend lengthwise along the pivot axis 112 between a first end 114 (FIG. 4) and a second end 116, with the first end 114 of the kingpin 38 being located generally adjacent to the top end 108 of the knuckle 36 and the second end 116 of the kingpin 38 being located generally adjacent to the bottom end 110 of the knuckle 36. Additionally, as shown in FIG. 3, the portion of the steering knuckle 36 defining the bore 106 may, in one embodiment, have a clevis-type configuration including an first knuckle portion 118 defining an upper section of the bore 106 and a second knuckle portion 120 defining a lower section of the bore 106, with the first and second knuckle portions 118, 120 being spaced apart from one another along the pivot axis 112 of the knuckle 36. In such an embodiment, the adjacent end 32 of the steering axle 30 may be rigidly or fixedly coupled to the kingpin 38 at a location between the first and second knuckle portions 118, 120. Thus, as the steering knuckle 36 rotates about the pivot axis 112 relative to the kingpin 38, the knuckle 36 similarly rotates relative to the adjacent end 32 of the steering axle 30.

Moreover, as shown in FIG. 3, one or more bearings may also be positioned within the bore 106 between the steering knuckle 36 and the kingpin 38 to facilitate rotation of the knuckle 36 relative to the kingpin 38. For example, as shown in the illustrated embodiment, a first bearing 122 may be provided between the kingpin 38 and the first knuckle portion 118 of the steering knuckle 36. Similarly, a second bearing 124 may be provided between the kingpin 39 and the second knuckle portion 120 of the steering knuckle 36.

Referring still to FIGS. 3-5, as indicated above, the system 100 (and related steering assembly 22) may also include a kingpin sensor 102 for monitoring the steering angle of the adjacent wheel assembly 14 (e.g., by detecting relative rotation between the steering knuckle 36 and the kingpin 38) and an associated sensor cap 104 for coupling the kingpin sensor 102 to the steering knuckle 36. As particularly shown in the illustrated embodiment, the sensor cap 104 may generally correspond to an end cap configured to be coupled to the steering knuckle 36 at one of the open ends of the bore 106, such as by coupling the sensor cap 104 to the first knuckle portion 118 at the top end 108 of the steering knuckle 36 such that the sensor cap 104 is received within and/or at least partially covers the adjacent open end of the bore 106. As such, in addition to providing suitable structure for coupling the kingpin sensor 102 to the steering knuckle 36, the sensor cap 104 may also serve as a grease cap for preventing leakages of grease or other lubricant contained within the bore 106.

As particularly shown in FIG. 4, the sensor cap 104 may generally include a hollow cap frame or body 130 forming the primary structure of the sensor cap 104. In one embodiment, the cap body 130 may extend between a top end 132 and a bottom end 134, with a portion of the cap body 130 located at or adjacent to its bottom end 134 being configured to be coupled to the steering knuckle 36 and a portion of the cap body 130 located at or adjacent to its top end 132 being configured to be coupled to the kingpin sensor 102. For example, as particularly shown in FIG. 4, the cap body 130 may define a plurality of external threads 136 around a portion of its outer perimeter extending from the bottom end 134 of the cap body 130. In such an embodiment, the steering knuckle 36 may similarly define a plurality of internal threads 138 within its bore 106 that extend from the adjacent open end of the bore 106 to allow the threaded portion of the cap body 130 to threadingly engage the corresponding threaded portion of the knuckle 36. As such, by screwing the threaded portion of the cap body 130 into the adjacent open end of the bore 106, the sensor cap 104 may be rigidly or fixedly coupled to the steering knuckle 36 (i.e., such that the sensor cap 104 rotates with the steering knuckle 36). Additionally, as shown in FIG. 5, one or more fastener openings 140 may be defined through the top end 132 of the cap body 130 that are configured to be aligned with one or more corresponding fastener openings 142 defined in a sensor housing 144 of the kingpin sensor 102. In such an embodiment, suitable fasteners (not shown), such as screws, pins, and/or the like, may be inserted through the aligned openings 140, 142 to couple the kingpin sensor 102 to the sensor cap 104.

Moreover, in several embodiments, the cap body 130 may also define one or more seal grooves configured to receive a suitable seal(s) for sealing the interface(s) defined between the sensor cap 104 and any adjacent component(s). For example, as particularly shown in FIG. 4, the cap body 130 may include an outwardly extending seal flange 146 defining a first seal groove 148 configured to receive a first seal 150 (e.g., an o-ring seal). In such an embodiment, the first seal 150 may be compressed between the cap body 130 and the steering knuckle 36 as the sensor cap 104 is screwed into the threaded portion of the bore 106, thereby sealing the interface between the top end 108 of the steering knuckle 36 and the bottom end 134 of the cap body 130. Additionally, as shown in FIG. 4, a second seal groove 152 may be defined at the top end 132 of the cap body 130 for receiving a corresponding second seal 154 (e.g., an o-ring seal). In such an embodiment, the second seal 154 may be compressed between the sensor housing 144 of the kingpin sensor 102 and the top end 132 of the cap body 130 when the kingpin sensor 102 is coupled to the sensor cap 104, thereby sealing the interface between the top end 132 of the cap body 130 and the sensor housing 144.

The sensor cap 104 may also include various other features for allowing the cap 104 to function as described herein. For instance, as particularly shown in FIG. 5, the sensor cap 104 may include a sensor opening 156 defined through the top end 132 of the cap body 130. As will be described below, such sensor opening 156 may allow a portion of the kingpin sensor 102 to extend through the sensor cap 104 and be coupled to the adjacent end 114 of the kingpin 38 to allow the sensor 102 to monitor the relative rotation between the steering knuckle 36 and the kingpin 38. Additionally, as shown in FIG. 5, the sensor cap 104 may also include a grease port 158 defined through the cap body 130 for injecting grease or any other suitable lubricant through the sensor cap 104 for receipt within the bore 106 to lubricate the rotational interface defined between the kingpin 38 and the steering knuckle 36.

In general, the kingpin sensor 102 of the disclosed system 100 may have any suitable configuration and/or may correspond to any suitable sensor or sensing device that allows the sensor 102 to detect relative rotation between the steering knuckle 36 and the kingpin 38. For example, in the embodiment of FIGS. 3-5, the kingpin sensor 102 corresponds to an optical encoder. However, in other embodiments, the kingpin sensor 102 may correspond to any other suitable sensor or sensing device and/or may rely upon any other suitable sensing technology. For example, as will be described below with reference to FIG. 6, the kingpin sensor 102 may, in an alternative embodiment, correspond to an inductive encoder or a resolver.

As indicated above, the kingpin sensor 102 may include an outer casing or housing 144 configured to be coupled to the sensor cap 104. Additionally, when the kingpin sensor 102 is configured as an optical encoder, the sensor 102 may also include an encoder shaft 160 extending outwardly from the housing 144 and an optical sensing device 162 disposed within the housing 144 for detecting relative rotation between the shaft 160 and the remainder of the sensor 102. As shown in FIG. 4, in one embodiment, the encoder shaft 160 may be configured to extend outwardly from the housing 144 and through the sensor opening 156 defined in the sensor cap 104 to allow an outer end 164 of the shaft 160 to be coupled to the adjacent end 114 of the kingpin 38. Additionally, as shown in FIG. 4, an inner end 166 of the shaft 160 may extend within the housing 144 and may include an optical sensor disk 168 (e.g., a quadrature disk) coupled thereto that includes one or more annular arrays of disk openings 170 spaced apart circumferentially around the disk 168. In such an embodiment, the sensor disk 168 may be configured to extend between one or more light emitters 172 and one or more corresponding light detectors 174 of the optical sensing device 162 to allow the sensor 102 to detect relative rotation between the shaft 160 and the sensor housing 144 by sensing the light passing through the sensor disk 168 (or the lack thereof) as the disk openings 170 pass by the light beam(s) emitted from the light emitter(s) 172. Given that the sensor housing 144 is fixedly coupled to the sensor cap 104 (which is, in turn, fixedly coupled to the steering knuckle 36), rotation of the steering knuckle 36 about the kingpin 38 results in corresponding rotation of the sensor housing 144 (and optical sensing device 162) relative to the shaft 160 and associated sensor disk 168, thereby allowing the sensor 102 to detect the rotation of the steering knuckle 36. The measurement signals output by the kingpin sensor 102 may then be transmitted via a communicative link (e.g., via sensor cable 176) to a computing system of the vehicle (e.g., vehicle computing system 302 shown in FIG. 6) for subsequent processing and/or analysis. For example, the measurement signals provided by the kingpin sensor 102 may be directly correlated to the steering angle of the associated wheel 44 of the steering assembly 22, thereby allowing the vehicle computing system to actively monitor the current steering angle for the vehicle.

As shown in FIG. 4, in one embodiment, the kingpin sensor 102 may also include a bearing 178 provided between the encoder shaft 160 and the sensor housing 144 to facilitate relative rotation between such components. Additionally, in one embodiment, one or more seals may be provided between the shaft 160 and the sensor housing 144 to prevent contamination of the interior of the sensor housing 144. For instance, as shown in FIG. 4, the kingpin sensor 102 may include an inner seal 180 positioned between the shaft 160 and the sensor housing 144 along the inner side of the bearing 178 and an outer seal 182 positioned between the shaft 160 and the sensor housing 144 along the outer side of the bearing 178.

Additionally, as particularly shown in FIG. 4, in one embodiment, the outer end 164 of the encoder shaft 160 may be configured to be coupled to the adjacent end 114 of the kingpin 38 via a misalignment coupler 184 to accommodate any misalignments between the pivot axis 112 of the steering knuckle 36 and the central axis (not shown) of the shaft 160. In such an embodiment, the misalignment coupler 184 may generally have any suitable configuration that allows it to function as described herein. For example, as shown in FIG. 5, the coupler 184 may, in one embodiment, include an assembly of rotational components 186 with mating slots 188 and ribs 190 for accommodating any misalignments between the pivot axis 112 of the steering knuckle 36 and the central axis of the shaft 160. However, it should be appreciated that, in alternative embodiments, the outer end 164 of the encoder shaft 160 may be coupled to the adjacent end 114 of the kingpin 38 without requiring a misalignment coupler, such as by directly coupling the encoder shaft 160 to the kingpin 38.

Figure 6:
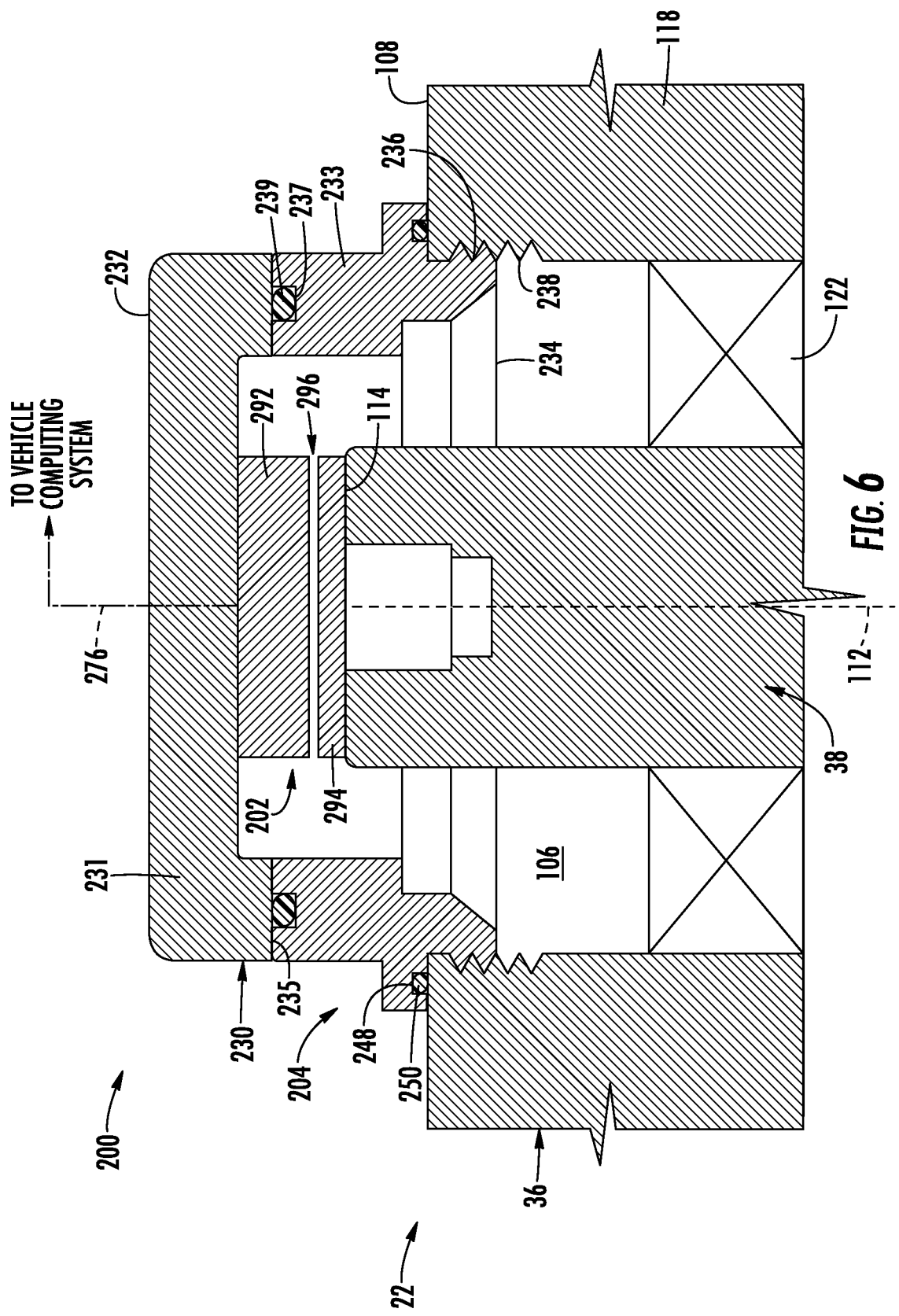
FIG. 6 illustrates a cross-sectional view of another embodiment of a system including a kingpin sensor and associated sensor cap installed relative to portions of a steering knuckle and adjacent kingpin of a steering assembly to allow the steering angle of an associated wheel to be monitored in accordance with aspects of the present subject matter.

Referring now to FIG. 6, a cross-sectional view of an alternative embodiment of a system 200 including a kingpin sensor 202 and associated sensor cap 204 is illustrated in accordance with aspects of the present subject matter, particularly illustrating the sensor 202 and the sensor cap 204 installed relative the portion of the kingpin 38 and steering knuckle 36 described above with reference to FIG. 4. In general, the sensor cap 204 may be configured similarly to the sensor cap 102 described above with reference to FIGS. 3-5. For instance, the sensor cap may include a cap body 230 extending between a top end 232 and a bottom end 234, with the bottom end 234 configured to be coupled to the steering knuckle 36 (e.g., via mating threads 236, 238 defined by the sensor cap 204 and the steering knuckle 36). Additionally, the sensor cap 204 may include one or more seal grooves configured to receive corresponding seals, such as a first seal 248 groove for receiving a first seal 250 at the interface defined between the steering knuckle 36 and the sensor cap 204.

However, unlike the embodiment described above, the cap body 230 is formed from a multi-piece assembly. For instance, as shown in FIG. 6, the cap body 230 includes an upper body portion 231 and a lower body portion 233, with the upper body portion 231 extending between the top end 232 of the cap body 230 and an interface 235 defined between the adjacent body portions 231, 233 and the lower body portion 233 extending between the interface 235 and the bottom end 234 of the cap body 230. In such an embodiment, the separate body portions 231, 233 may be configured to be coupled to each other using any suitable means, such as by defining aligned fastener openings (not shown) through the body portions 231, 233 for receiving suitable fasteners (e.g., screws, pins, and/or the like). Additionally, as shown in FIG. 6, in one embodiment, one or both of the body portions 231, 233 may define a seal groove 237 at the interface 235 defined between such body portions 231, 233 for receiving a seal 239 (e.g., an o-ring seal) to seal off the interface 235.

Moreover, as shown in FIG. 6, unlike the kingpin sensor 102 described above with reference to FIGS. 3-5, the kingpin sensor 202 is configured as an inductive encoder. In such an embodiment, the sensor 202 may include a stator 292 coupled to either the sensor cap 204 or the kingpin 38 and a rotor 294 coupled to the other of the sensor cap 204 or the kingpin 38, with a small gap or clearance 296 being provided between the stator 292 and the rotor 294. For example, in the illustrated embodiment, the stator 292 is coupled to the upper body portion 231 of the sensor cap 204 and the rotor 294 is coupled to the adjacent end 114 of the kingpin 38. However, in other embodiments, the configuration may be reversed, with the stator 292 being coupled to the kingpin 38 and the rotor 294 being coupled to the sensor cap 204. Regardless, when the kingpin sensor 202 is corresponds to an inductive encoder, the sensor 202 may be configured to detect the position of the stator 292 relative to the rotor 294 (or vice versa) using conventional inductive or transformer principles. For instance, the stator 292 may include a powered electronic component (e.g., a printed circuit board) that generates an output signal based on inductive principles with relative rotation between the stator 292 and the rotor 294. As such, the sensor 202 may be configured to directly monitor the rotation of the steering knuckle 36 relative to the kingpin 38. Specifically, given that the stator 292 is fixedly coupled to the sensor cap 204 (which is, in turn, fixedly coupled to the steering knuckle 36), rotation of the steering knuckle 36 about the kingpin 38 results in corresponding rotation of the stator 292 relative to the rotor 294. The measurement signals output by the kingpin sensor 202 may then be transmitted via a communicative link (e.g., via a sensor cable 276) to a computing system of the vehicle (e.g., vehicle computing system 302 shown in FIG. 7) for subsequent processing and/or analysis. For examples, the measurement signals provided by the kingpin sensor 202 may be directly correlated to the steering angle of the associated wheel 44 of the steering assembly 22, thereby allowing the vehicle computing system to actively monitor the current steering angle for the vehicle.

It should be appreciated that, in alternative embodiments, the relative rotation between the stator 292 and the rotor 294 may be detected using any other suitable sensing technology. For example, as an alternative to being configured as an inductive encoder, the kingpin sensor 202 may be configured as a resolver. In such an embodiment, the stator may include, for instances, windings (e.g., copper windings) positioned relative to a metal rotor (e.g., an iron or steel rotor) to allow the relative rotation between the stator and the rotor to be monitored based on the measured electrical output of the windings when provided an AC drive input to the sensor.

Referring now to FIG. 7, a schematic view of an example system 300 that may be utilized, for example, in controlling the operation of a vehicle is illustrated in accordance with aspects of the present subject matter. In several embodiments, the system may include a vehicle computing system 302 associated with or incorporated into an autonomous vehicle, such as the vehicle 10 described above with reference to FIG. 1.

Using the vehicle computing system 302, the vehicle may be configured to operate in a plurality of operating modes 308A-C. For example, the vehicle can be configured to operate in a fully autonomous (e.g., self-driving) operating mode 308A in which the vehicle can drive and navigate with no input from a user present in the vehicle (and/or at a remote location). Additionally, the vehicle can be configured to operate in a semi-autonomous operating mode 308B in which the vehicle can operate with some input from a user present in the vehicle (and/or at a remote location). Moreover, the vehicle can enter into a manual operating mode 308C in which the vehicle is fully controllable by a user (e.g., human operator) and can be prohibited from performing autonomous navigation (e.g., autonomous driving). In some implementations, the vehicle can also implement vehicle operating assistance technology (e.g., collision mitigation system, power assist steering, etc.) while in the manual operating mode 308C to help assist the operator of the vehicle.

The vehicle computing system 302 can include one or more computing devices located onboard the vehicle. For example, the computing device(s) can be located on and/or within the vehicle. The computing device(s) can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the vehicle (e.g., its computing system, one or more processors, etc.) to perform operations and functions, such as those described herein for monitoring the steering angle of one or more of the vehicle's wheels and/or for controlling the operation of the vehicle based, at least in part, on the monitored steering angle.

As shown in FIG. 7, the system 300 can include one or more sensors 312, an autonomy computing system 314, and one or more vehicle control systems 316. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

In one embodiment, the sensor(s) 312 can be configured to acquire sensor data 318 associated with one or more objects that are proximate to the vehicle (e.g., within a field of view of one or more of the sensor(s) 312). In this regard, the sensor(s) 312 can include, for example, a LIDAR system, a RADAR system, one or more cameras (e.g., visible spectrum cameras, infrared cameras, etc.), motion sensors, and/or other types of imaging capture devices and/or sensors. In such an embodiment, the sensor data 318 can include image data, radar data, LIDAR data, and/or other data acquired by the sensor(s) 312. In addition (or as an alternative thereto), the sensor(s) 312 can include one or more of the kingpin sensors 102, 202 described above. In such an embodiment, the sensor data 318 can include steering data associated with the position of the steering knuckle(s) being monitored relative to its associated kingpin(s). Regardless, the sensor(s) 312 can be configured to provide the sensor data 318 to the autonomy computing system 314.

In addition to the sensor data 318, the autonomy computing system 314 can retrieve or otherwise obtain other types of data associated with a geographic area in which the objects (and/or the vehicle) are located. For example, the autonomy computing system 314 can obtain map data 320 that provides detailed information about the surrounding environment of the vehicle. The map data 320 can provide information regarding: the identity and location of different roadways, road segments, buildings, sidewalks, walls, or other items; the location and directions of traffic lanes (e.g., the boundaries, location, direction, etc. of a parking lane, a turning lane, a bicycle lane, or other lanes within a particular travel way); traffic control data (e.g., the location and instructions of signage, traffic lights, or other traffic control devices); the location of obstructions (e.g., roadwork, accident, etc.) and/or any other map data that provides information that assists the computing system in comprehending and perceiving its surrounding environment and its relationship thereto. In some implementations, the autonomy computing system 314 can obtain satellite imagery of a geographic area (e.g., overhead imagery) in which the object(s) and/or the autonomous vehicle is located. The satellite imagery can be provided to the vehicle computing system 302 from a separate, operations computing system and/or other computing device(s) that are remote from the vehicle.

The system 300 can include a positioning system 322. The positioning system 322 can determine a current position of the vehicle. The positioning system 322 can be any device or circuitry for analyzing the position of the vehicle. For example, the positioning system 322 can determine position by using one or more of inertial sensors, a satellite positioning system, based on IP/MAC address, by using triangulation and/or proximity to network access points or other network components (e.g., cellular towers, WiFi access points, etc.) and/or other suitable techniques. The position of the vehicle can be used by various systems of the vehicle computing system 302 and/or provided to one or more remote computing device(s). For example, the map data 320 can provide the vehicle relative positions of the surrounding environment of the vehicle. The vehicle can then identify its position within the surrounding environment (e.g., across six axes) based at least in part on the data described herein. For example, the vehicle can process the sensor data 318 (e.g., LIDAR data, camera data) to match it to a map of the surrounding environment to get an understanding of the vehicle's position within that environment.

The autonomy computing system 314 can also include a perception system 324, a prediction system 326, a motion planning system 328, and/or other systems that cooperate to perceive the surrounding environment of the vehicle and determine a motion plan for controlling the motion of the vehicle accordingly. For example, the autonomy computing system 314 can receive the sensor data 318 from the sensor(s) 312, attempt to comprehend the surrounding environment by performing various processing techniques on the sensor data 318 (and/or other data), and generate an appropriate motion plan through such surrounding environment. The autonomy computing system 314 can control the one or more vehicle control systems 316 to operate the vehicle 304 according to the motion plan.

The autonomy computing system 314 can identify one or more objects that are proximate to the vehicle based at least in part on the sensor data 318 and/or the map data 320. For example, the perception system 324 can process the sensor data 318 to detect one or more objects that are within the surrounding environment of the vehicle as well as state data 330 associated therewith. The state data 330 can be indicative of at least a current or past state of an object that is within the surrounding environment of the vehicle. For example, the state data 330 for each object can describe an estimate of the object's current and/or past location (also referred to as position), current and/or past speed/velocity, current and/or past acceleration, current and/or past heading, current and/or past orientation, size/footprint, class (e.g., vehicle class vs. pedestrian class vs. bicycle class), the uncertainties associated therewith, and/or other state information. The perception system 324 can provide the state data 330 to the prediction system 326.

The prediction system 326 can create predicted data 332 associated with each of the respective one or more objects proximate to the vehicle. The predicted data 332 can be indicative of one or more predicted future locations of each respective object that are determined as further described herein. The predicted data 332 can be indicative of a predicted trajectory (e.g., predicted path) of at least one object within the surrounding environment of the vehicle. For example, the predicted trajectory can indicate a path along which the respective object is predicted to travel over time. In some implementations, the predicted data 332 can indicate the speed at which the object is predicted to travel along the predicted trajectory. The prediction system 326 can provide the predicted data 332 associated with the object(s) to the motion planning system 328, for generation of a motion plan 334.

The vehicle computing system 302 (e.g., the prediction system 326 of the autonomy system 314) can include, employ, and/or otherwise leverage a model 336 to help generate the predicted data 332. In particular, the model 336 can be a machine-learned model. For example, the machine-learned model can be or can otherwise include one or more various model(s) such as, for example, neural networks (e.g., deep neural networks), or other multi-layer non-linear models. The machine-learned model can include neural networks such as, for example, a convolutional neural networks, recurrent neural networks (e.g., long short-term memory recurrent neural networks), feed-forward neural networks, and/or other forms of neural networks. For instance, supervised training techniques can be performed to train the model 336 to predict a future trajectory of object(s) within the surrounding environment of the vehicle.

The vehicle computing system 302 (e.g., the prediction system 326 of the autonomy system 314) can generate a specific data set to be used as an input into the model 336. For instance, the vehicle computing system 302 can obtain state data 330 associated with an object that is within the surrounding environment of the vehicle. The vehicle computing system 302 can also obtain data associated with a geographic area in which the object is located (e.g., map data 320, satellite imagery, sensor data 318, etc.). The vehicle computing system 302 (e.g., the prediction system 326) can generate a combined data set 337 associated with the object based at least in part on the state data 330 associated with the object (e.g., obtained via the perception system 324) and the data associated with the geographic area in which the object is located. For example, the vehicle computing system 302 can fuse the state data 330 associated with the object and the data associated with the geographic area in which the object is located, to generate the combined data set 337. The combined data set 337 can be indicative of the data associated with the geographic area projected onto the state data 330 (e.g., to a coordinate system associated with the object). Such fusion can provide a more accurate context of the object's current and/or past state(s) within the geographic area.

Additionally, the vehicle computing system 302 can control the motion of the vehicle 304 based at least in part on the output from the model 336. For example, the motion planning system 328 can provide the motion plan 334 with data indicative of the vehicle actions, a planned trajectory, and/or other operating parameters to the vehicle control system(s) 316 (shown in FIG. 7) to implement the motion plan 334 for the vehicle. The vehicle control system(s) 316 can include a vehicle controller configured to translate the motion plan 334 into instructions. The vehicle controller can translate the motion plan 334 into instructions for the appropriate vehicle controls (e.g., acceleration control, brake control, steering control, etc.). By way of example, the vehicle controller can translate the determined motion plan 334 into instructions to adjust the steering of the vehicle "X" degrees, apply a certain magnitude of braking force, etc. in order to cause the vehicle to travel according to the one or more planned vehicle trajectories. The vehicle controller can send one or more control signals to the responsible vehicle control component (e.g., braking control system, steering control system, acceleration control system) to execute the instructions and implement the motion plan 334. For example, control signals may be transmitted to a control or steering valve 340 configured to regulate the flow of fluid to the steering cylinder 56 of the disclosed steering assembly 22, thereby allowing the vehicle controller to actively adjust the steering angle of one or more of the vehicle's wheels. In doing so, the sensor measurements provided by the disclosed kingpin sensor(s) 102, 202 may be used as feedback for controlling the steering valve 340.

Referring now to FIG. 8, a schematic view of example components of one embodiment the vehicle computing system 302 is illustrated in accordance with aspects of the present subject matter. As shown, the vehicle computing system 302 can include one or more computing device(s) 401. The computing device(s) 401 of the vehicle computing system 302 can include processor(s) 402 and a memory 404 (e.g., onboard the vehicle). The one or more processors 402 can be any suitable processing device (e.g., a processor core, a microprocessor, an ASIC, a FPGA, a controller, a microcontroller, etc.) and can be one processor or a plurality of processors that are operatively connected. The memory 404 can include one or more non-transitory computer-readable storage media, such as RAM, ROM, EEPROM, EPROM, one or more memory devices, flash memory devices, etc., and combinations thereof.

The memory 404 can store information that can be accessed by the one or more processors 402. For instance, the memory 404 (e.g., one or more non-transitory computer-readable storage mediums, memory devices) can include computer-readable instructions 406 that can be executed by the one or more processors 402. The instructions 406 can be software written in any suitable programming language or can be implemented in hardware. Additionally, or alternatively, the instructions 406 can be executed in logically and/or virtually separate threads on processor(s) 402.

For example, the memory 404 can store instructions 406 that when executed by the one or more processors 402 cause the one or more processors 402 to perform operations such as any of the operations and functions of the vehicle computing system 302, the vehicle, or for which the vehicle computing system 302 and/or the vehicle are configured, as described herein, the operations for monitoring steering angles and/or controlling an autonomous vehicle, and/or any other functions for the vehicle computing system 302, as described herein.

The memory 404 can store data 408 that can be obtained, received, accessed, written, manipulated, created, and/or stored. The data 408 can include, for instance, sensor data, state data, predicted data, data associated with a geographic area, input data, data indicative of machine-learned model(s), data indicative of model outputs, motion planning data, and/or other data/information described herein. In some implementations, the computing device(s) 401 can obtain data from one or more memory device(s) that are remote from the vehicle.

The computing device(s) 401 can also include a communication interface 409 used to communicate with one or more other system(s) on-board the vehicle and/or a remote computing device that is remote from the vehicle. The communication interface 409 can include any circuits, components, software, etc. for communicating via one or more networks. In some implementations, the communication interface 409 can include for example, one or more of a communications controller, receiver, transceiver, transmitter, port, conductors, software and/or hardware for communicating data/information.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A vehicle, comprising:
   an axle beam;
   a steering knuckle rotatable relative to the axle beam about a kingpin extending through a bore defined by at least a portion of the steering knuckle;
   a wheel coupled to the steering knuckle such that a steering angle of the wheel varies as the steering knuckle rotates about the kingpin;
   a sensor cap coupled to the steering knuckle at an open end of the bore such that the sensor cap is configured to rotate with the steering knuckle about the kingpin;
   a kingpin sensor provided in operative association with the sensor cap, the kingpin sensor being configured to generate signals indicative of the steering angle of the wheel by detecting relative rotation between the steering knuckle and the kingpin, the kingpin sensor comprising:
      a sensor housing coupled to the sensor cap for rotation therewith;
      a shaft including a first end and a second end, the shaft extending through the sensor cap such that the first end of the shaft is positioned within the sensor housing and the second end of the shaft is coupled to a portion of the kingpin; and
      an optical sensing device supported within the sensor housing relative to the shaft, the optical sensing device being configured to detect relative rotation between the sensor housing and the shaft as the steering knuckle rotates about the kingpin; and
   a vehicle computing system communicatively coupled to the kingpin sensor, the vehicle computing system including one or more processors and one or more tangible, non-transitory, computer readable media that collectively store instructions that when executed by the one or more processors cause vehicle computing system to actively monitor the steering angle of the wheel based on the signals received from the kingpin sensor.

2. The vehicle of claim 1, wherein the vehicle corresponds to an autonomous vehicle, the vehicle computing system being further configured to actively control an operation of the vehicle based, at least in part, on the monitored steering angle.

3. The vehicle of claim 2, further comprising a steering cylinder coupled to the steering knuckle, the vehicle computing system being configured to control an operation of the steering cylinder based, at least in part, on the monitored steering angle to adjust the steering angle of the wheel.

4. The vehicle of claim 1, wherein the second end of the shaft is coupled to the portion of the kingpin via a misalignment coupler.

5. The vehicle of claim 1, wherein the sensor cap is configured to be threadably coupled to the open end of the bore.

6. The vehicle of claim 1, wherein the sensor cap defines at least one seal groove configured to receive a seal for sealing an interface defined between the sensor cap and at least one of the steering knuckle or the kingpin sensor.

7. An apparatus comprising:
   a steering knuckle rotatable about a kingpin extending through a bore defined by at least a portion of the steering knuckle;
   a sensor cap coupled to the steering knuckle at an open end of the bore such that the sensor cap is configured to rotate with the steering knuckle about the kingpin, the sensor cap comprising a cap body including an upper portion and a lower portion, the lower portion of the cap body extending through the open end of the bore and threadably engaging the steering knuckle, the upper portion of the cap body extending outwardly from the lower portion of the cap body away from open end of the bore; and
   a kingpin sensor positioned between the sensor cap and the kingpin, the kingpin sensor being configured to generate a signal indicative of a steering angle of the wheel by detecting relative rotation between the steering knuckle and the kingpin, the kingpin sensor comprising:
      a stator coupled to one of the upper portion of the cap body or the kingpin and
      a rotor coupled to the other of the upper portion of the cap body or the kingpin such that an air gap is defined directly between the stator and the rotor of the kingpin;
   wherein the kingpin sensor is configured to detect relative rotation between the steering knuckle and the kingpin by detecting relative rotation between the stator and the rotor of the kingpin sensor.

8. The apparatus of claim 7, wherein the sensor cap defines a first seal groove configured to receive a first seal for sealing an interface defined between the lower portion of the cap body of the sensor cap and the steering knuckle.

9. The apparatus of claim 7, further comprising a computing device communicatively coupled to the kingpin sensor, the computing device including one or more processors and one or more tangible, non-transitory, computer readable media that collectively store instructions that when executed by the one or more processors cause computing device to actively monitor the steering angle of the wheel based on sensor measurements received from the kingpin sensor.

10. A steering assembly for a vehicle, comprising:
   an axle beam;
   a steering knuckle rotatable relative to the axle beam about a kingpin extending through a bore defined by at least a portion of the steering knuckle;
   a wheel coupled to the steering knuckle such that a steering angle of the wheel varies as the steering knuckle rotates about the kingpin;
   a sensor cap coupled to the steering knuckle at an open end of the bore such that the sensor cap is mounted for rotation with the steering knuckle about the kingpin;
   a kingpin sensor coupled between the sensor cap and the kingpin, the kingpin sensor being configured to detect relative rotation between the steering knuckle and the kingpin, the kingpin sensor comprising:
      a sensor housing coupled to the sensor cap for rotation therewith; and a shaft including a first end and a second end, the shaft extending through the sensor cap such that the first end of the shaft is positioned within the sensor housing and the second end of the shaft is coupled to a portion of the kingpin; and a misalignment coupler positioned between the second end of the shaft and the portion of the kingpin.

11. The steering assembly of claim 10, further comprising an optical sensing device supported within the sensor housing relative to the shaft, the optical sensing device being configured to detect relative rotation between the sensor housing and the shaft as the steering knuckle rotates about the kingpin.

12. The steering assembly of claim 11, wherein the optical sensing device comprises a sensor disk positioned within the sensor housing and being coupled to the shaft, the sensor disk defining an array of disk openings.

13. The steering assembly of claim 12, wherein the optical sensing device further comprises a light emitter, the optical sensing device being configured to detect relative rotation between the sensor housing and the shaft by sensing light emitted from the light emitter as the light that passes through the disk openings of the sensor disk.

14. The vehicle of claim 1, wherein the optical sensing device comprises a sensor disk positioned within the sensor housing and being coupled to the shaft, the sensor disk defining an array of disk openings.

15. The vehicle of claim 14, wherein the optical sensing device further comprises a light emitter, the optical sensing device being configured to detect relative rotation between the sensor housing and the shaft by sensing light emitted from the light emitter as the light that passes through the disk openings of the sensor disk.

16. The vehicle of claim 6, wherein the sensor cap defines a first seal groove configured to receive a first seal for sealing an interface defined between the sensor cap and the steering knuckle and a second seal groove configured to receive a second seal for sealing an interface defined between the sensor cap and the sensor housing.

17. The apparatus of claim 7, wherein the stator and rotor form part of an inductive encoder.

18. The apparatus of claim 17, wherein the sensor cap defines a second seal groove configured to receive a second seal for sealing an interface defined between the upper and lower portions of the cap body of the sensor cap.

* * * * *